US006947612B2

(12) United States Patent
Helms et al.

(10) Patent No.: US 6,947,612 B2
(45) Date of Patent: Sep. 20, 2005

(54) METHODS AND APPARATUS FOR IMAGE CAPTURE AND DECODING IN A CENTRALIZED PROCESSING UNIT

(75) Inventors: Gil W. Helms, Monroe, NC (US); Brian R. Dobeck, Matthews, NC (US); Jeffrey D. Harper, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 512 days.

(21) Appl. No.: 09/932,148

(22) Filed: Aug. 17, 2001

(65) Prior Publication Data

US 2002/0039457 A1 Apr. 4, 2002

Related U.S. Application Data

(60) Provisional application No. 60/236,894, filed on Sep. 29, 2000.

(51) Int. Cl.[7] .................................................. G06L 9/60
(52) U.S. Cl. ....................... 382/305; 382/282; 382/284; 382/312; 358/505; 358/450
(58) Field of Search ................................ 382/282, 284, 382/307, 312, 233, 294, 305; 358/505, 538, 540, 450, 453

(56) References Cited

U.S. PATENT DOCUMENTS 5,861,892 A * 1/1999 Sato et al. .................. 345/637
5,917,947 A * 6/1999 Ishida et al. ................ 382/232
5,992,744 A * 11/1999 Smith et al. ........... 235/462.11
6,023,345 A * 2/2000 Bloomfield ................. 358/402
6,123,261 A * 9/2000 Roustaei ................ 235/462.01
6,144,403 A * 11/2000 Otani ...................... 348/14.12
6,298,076 B1 * 10/2001 Caprara et al. ............... 372/43

* cited by examiner

*Primary Examiner*—Bhavesh M. Mehta
*Assistant Examiner*—Yosef Kassa
(74) *Attorney, Agent, or Firm*—Alston & Bird LLP

(57) ABSTRACT

An improved method and device for capturing image data benefits from having a single central processor execute the operating system, and the image capture, decode and processing programs. A method for capturing of image data comprises transmitting image data from an imager, assembling the image data, assigning a memory address to the assembled image data and transferring the assembled image data into system memory. This method is capable of central processing whereby the capturing of image data is executed via the main processor without having to invoke a dedicated processor or incorporate external components, such as additional PCBs, external digital signal processing or external data storage. Additionally, an imaging device comprises an image builder module that receives image data from the imager bus and assembles the data, and a transfer controller that initiates the image builder module and controls the transfer of image data into and out of memory.

25 Claims, 2 Drawing Sheets

METHODS AND APPARATUS FOR IMAGE CAPTURE AND DECODING IN A CENTRALIZED PROCESSING UNIT

CROSS-REFERENCE TO RELATED APPLICATIONS

The present application claims priority from U.S. Provisional Patent Application Ser. No. 60/236,894 filed on Sep. 29, 2000, the contents of which are incorporated by reference

FIELD OF THE INVENTION

The present invention relates to image capturing apparatus, and more particularly to a method for capturing and decoding and processing the image data in a centralized processing unit.

BACKGROUND OF THE INVENTION

Portable imaging devices such as bar code readers, optical character readers, digital cameras and the like have come into widespread use in large numbers of retail, industrial and medical applications. Such imaging devices are used to perform routine data entry functions such as pricing, inventory control, etc., with an accuracy and reliability that far exceeds that of manual data entry. These and other advantages, such as high data throughput rates and direct compatibility with data processing devices and systems, assures that imaging devices will become more prevalent in the future. As the use of such devices increases the demands on the devices will increase as well. These demands will dictate that the portable imaging devices of the future read, record and decode ever-increasing quantities and densities of optically encoded data.

Portable imaging devices, such as bar code readers, are known for reading one-dimensional (1D) and two-dimensional (2D) bar code symbols, such as bar coded information in supermarkets, etc. A variety of different bar code symbols are widely known and are currently being used in various applications. For example, 1D bar code symbologies, such as Code 49 and PDF 417, have been developed to allow encoding of large amounts of data. Code 49 symbology is described in U.S. Pat. No. 4,794,239, issued in the name of inventor Allais and PDF 417 symbology is described in U.S. Pat. No. 5,340,786, issued in the name of inventors Paviudus, et al. These symbologies use stacked symbols that partition the encoded data into multiple rows, each including a respective 1D bar code pattern. In operation, all or most of the symbols must be scanned, decoded and then linked together to form a complete message.

In accommodating the need for reading, recording, decoding and processing increasing quantities and densities of data, 2D matrix symbologies have been developed which offer orientation-free scanning and greater data densities and capacities than the 1D counterparts. 2D matrix codes encode dark or light data elements within a regular polygonal matrix, accompanied by graphical finder, orientation and reference structures. For an example of a 2D symbology see MaxiCode as described in detail in the publication "International Symbology Specification—MaxiCode", by AIM International, Inc.

2D solid state image sensors, such as scanners or charge couple device (CCD) image sensors, are capable of receiving optically encoded data images and converting them to electrical signals. When these image sensors are incorporated with optical imaging systems that provide properly exposed and focused images of their target and with signal processors that include suitable decoding software, these image sensors are able to read data from various types, shapes and sizes of barcodes and other symbols.

Current 2D and 1D/2D discriminating imaging devices require the implementation of a separate, or dedicated, processor and associated memory to accommodate the computationally intensive image capture and decoding processes while a separate main processor is responsible for running the operating system and processing the decoded image data. In most instances, this would require a separate printed circuit board (PCB) to physically house the image capture and decode processor and related hardware in addition to the host PCB that physically houses the separate main operating system processor. As such, information transfer between the image capture and decode processor and the operating system processor require additional switching hardware. Still further, the prior art multiprocessor implementations required serial and parallel transfer capabilities, buffers, UARTS (serial ports), transfer hardware, additional protocols, and may have further required second power supplies, memory blocks and printed circuit boards. Thus, the implementation of dual processors have made for complex devices that require more operating power and more maintenance related to servicing and updating the multiple processor devices. The use of a single processor results in faster processing, fewer errors, more efficiencies, less expense, less power consumption, less heat generation, and requires less space.

A desired imaging device would incorporate a single main processor that would be capable of running the operating system and application program as well as executing the capture and decode program for the image data. An imaging device that has a single processor capable of all of these operations provides a more streamlined and efficient apparatus, and may also use less expensive components. By eliminating from the overall imaging device architecture the need to incorporate a second processor and, in most instances, an associated PCB, the end-user will typically benefit from being provided a device that costs less, is more reliable and less complex. Thus, the invention teaches how to combine the heretofore separate and independent operations mandating multiple microprocessors' memories and transfer interfaces into a single processor capable of multiple operations. Such a combination is not merely the natural consequence of improvements in microprocessor capacity and capabilities because of the necessity to combine separate hardware, software and protocols into a single processor design. The invention teaches how to accomplish all of these disparate tasks with a central processor, and do so in a multi-tasking environment that was not present when using the prior art technique of employing a dedicated (single task) processor to execute the image capture and decode functions.

SUMMARY OF THE INVENTION

The present invention provides for an improved method and device for capturing image data. This method and corresponding device is accomplished by a central processor capable of running the operating system and the capture, decode and application programs. Image data is captured in a more efficient manner and subsequent decoding of image data is performed in a more timely and efficient manner.

A method for capturing optical image data by a central processor that is additionally responsible for executing the operating system and application program of the image capture device comprises generating an image capture signal, assigning a memory address for the image data to be assembled, receiving optical image data from an imager, assembling the image data, storing the assembled image data and decoding the assembled image data and executing the application program at the central processor, whereby the optical image is captured, decoded and processed by the central processor. This method provides for the capture process to be executed on the same central processor that executes the operating system, captures and decodes the optical image data, and processes the decoded optical image, thereby eliminating the need to incorporate external components, such as additional PCBs, external digital signal processing or external data storage. An imaging device for capturing optical image data according to the present invention comprises an imager for generating image data segments, an image data assembler that receives the image data segments and assembles image data components, a memory module that stores the assembled image data components, and a central processor that executes the image capture process and the device operating system and application program of the image capture device, whereby the optical image is captured, decoded and processed by a central processor.

In one embodiment the method for capturing image data includes transmitting 8-bit segments of image data on an imager bus that is in communication with an imager and the host. The main processor writes a memory address and communicates the memory address to the system memory via the transfer controller. The image data is received at the host and an image builder or a long word builder module is invoked to begin assembling the image data. In one embodiment, the image data is assembled by combining four 8-bit segments into a 32 bit word. Once data is assembled, the image builder module asserts a request via an image request line that signals a transfer controller to initiate an image data transfer to memory. Transferring the assembled image data into system memory completes the capture process. This process will typically entail having the transfer controller assert a data bus in communication with the image builder module and the system memory, transferring eight 32 bit word blocks across the data bus from the image builder module to the system memory, and sequentially storing the blocks of data into system memory to capture an entire image.

In an alternate embodiment the invention is defined in a method for centralized capturing and decoding of image data in real time from a continuously displayed image video signal. In addition to the method steps defined above detailing the capturing process, a method for decoding entails decoding the stored image data via the main processor. This method of central processing provides for the main system processor to execute the capture and decode processes, as well as execute the operating system.

The invention is also embodied in a imaging device that is capable of centrally processing the execution of image data capture, image data decoding and overall system operation. The imaging device comprises an imager bus in communication with an imager device, an image builder module that receives image data from the imager bus and assembles the data, and a transfer controller that initiates the image builder module and controls the transfer of image data into memory. In addition, the imaging device comprises a data bus in communication with the image builder module and a memory unit that receives assembled image data from the data bus and sequentially stores the image data into memory.

In this embodiment, the image builder module and the transfer controller function in unison to create direct memory transfer of the image data. In one embodiment of the invention, the image builder module and the transfer controller are components within a programmable logic device located on the host.

The image capture process and device of the present invention allow for all integral processes and components of the capture process to be centrally processed within the same processor that executes the operating system and the application program for processing the decoded image data. This includes starting the process, assigning memory addresses, assembling the image data, controlling the transfer of image data into storage and storing the information in memory. Additionally, the central processor that provides control of the capture process may be located on the host device and provides the capability to decode and process the stored image data. By centrally locating all processing activities the present invention provides for a more efficient means of capturing and decoding and ultimately using the image data. In addition, the present invention provides for a more efficient and streamlined means without the need to incorporate external hardware, such as additional PCBs, signal processing, transfer or memory devices.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
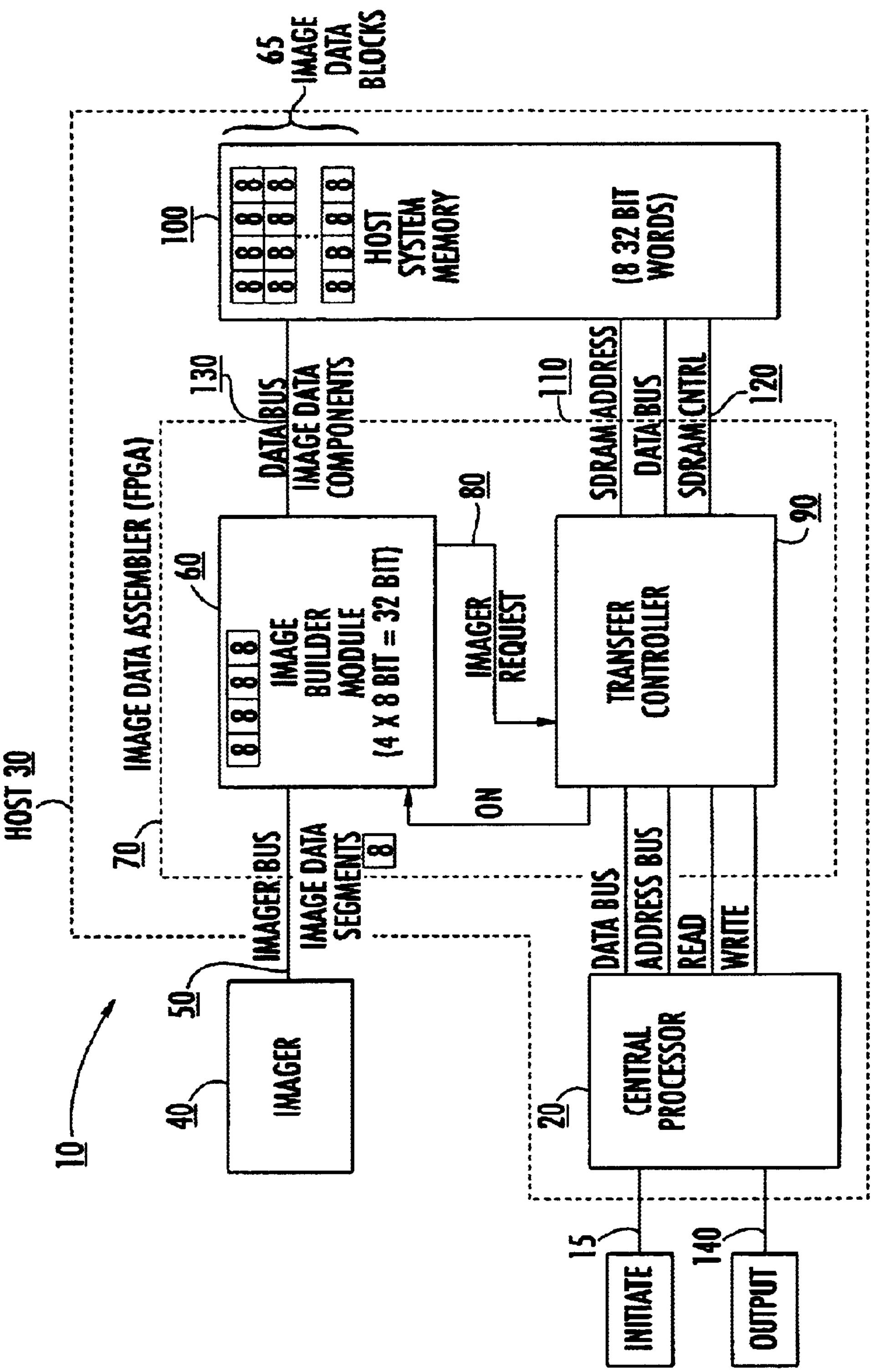
FIG. 1 is a block diagram of the image capture and decode process within a centralized processing configuration in accordance with an embodiment of the present invention.

In accordance with an embodiment of the present invention, FIG. 1 is a block diagram of a system for capturing, decoding and processing image data using a central processor. This image system 10 is typically housed within a portable imaging device, such as a bar code reader or the like. Centralized processing is accomplished by the processor 20, typically located on the host (main PCB) 30. As shown in FIG. 1, all components of the invention will typically be physically located on the host for the purpose of minimizing overall device packaging, however, the components may be physically located external to the host (i.e. on separate PCBs) if the application so dictates. The processor is typically tasked with starting the image capture process, the image decoding process, the operating system, and the application program for processing the decoded image data. By comparison, known imaging devices will typically employ a dedicated processor for image capture and decoding, another processor that executes the operating system the application program.

The image system includes an imager 40, such as a camera or CCD array or the like, that provides the capture and decode device with an image signal, such as a continuous image video signal of the object upon which it is targeted. The imager device may comprise an image sensor (not shown in FIG. 1), such as a 1D or 2D CCD or CMOS solid state image sensor together with an imaging optics assembly (not shown in FIG. 1) for receiving and focusing an image of the object onto a substrate of the image sensor. Additionally, the imager device will include a frame grabber (not shown in FIG. 1) that includes electronics that allow the imager device to interface with the host. Such apparatus is well-known to those skilled in the imaging arts.

An imager bus 50 is in communication with the imager device 40 and the host 30 and allows image data segments to be transmitted from the imager to the long word or image builder module 60. The image builder module 60 is enabled when an initiate signal 15 is generated, such as one generated by an operator depressing a trigger or an object being sensed by a detector. The initiate signal, which may be generated by an application program or a switch, is typically provided to the central processor 20, which responds by generating a memory address for the image data segments. In a preferred embodiment, this is a beginning memory address signal written to the transfer controller 90. The generation of the memory address by the central processor causes the transfer controller to issue an on command to the image builder module 60. Alternatively, the initiate signal could be provided directly to the transfer controller or the image builder module.

The image builder module is typically written into a programmable logic device 70, such as a field programmable gate array (FPGA) device. The programmable logic device will typically be physically located on the host 30. In one embodiment of the invention, the image builder module receives image segments from the imager device on bus 50 in the form of pixels that are 8 bits wide. The image builder module then assembles four of the 8 bit wide segments into a 32 bit word as an image data component. Eight of these 32 bit words are assembled into an image data block 65. After an image data block is assembled an iterative process is initiated with the transfer controller for transferring the image data components into memory. The image builder module asserts the image request line 80, which signals the transfer controller 90 to begin the transfer of the assembled image data component (i.e. an 8×32 bit word) into system memory 100. As additional 32 bit words are assembled, the image builder module will repeat the assertion of the image request line and the subsequent transfer into memory. This process typically continues until an entire image is transferred into memory. The size of the image data segments, image data components or image data blocks may vary as necessary or desireable.

The transfer controller is typically written into the programmable logic device 70 that is typically physically located on the host 30. The transfer controller is responsible for receiving the starting address from the central processor, turning on or off the image builder module (i.e. informing the image builder module that it may or may not assemble incoming image data segments or image data blocks). The image data builder module may be turned on or off at predetermined times to capture a single frame in its entirety, and to avoid capturing partial image. Additionally, the transfer controller is responsible for gaining control of the data bus 130 and managing the SDRAM (memory) address and control lines 110 and 120 to transfer each image data block to system memory in sequence.

In one embodiment, the programmable logic device 70 that typically encompasses the image builder module 60 and the transfer controller 90 will comprise a field programmable gate array (FPGA). FPGA devices are available from the Xilinx Corporation of San Jose, Calif. The FPGA functions as an image data assembler 70 and transfer mechanism, and provides various features to the overall portable imaging device. Included in these features is the ability to act as the interface for the imager 40, the means for accessing the main system memory 100 directly to transfer image data from the imager and to the processor, and the capability for serial multiplexing and interfacing with the central processor. In this regard, the serial port provided by the processor can be multiplexed by the programmable logic device if necessary.

The system memory 100 that is typically physically located on the host receives image data components from the image builder module. The system memory stores the image data components in image blocks. In one embodiment, the system memory will comprise DRAM made up of a single bank of 32 bit memory. In one embodiment of the invention the system memory receives eight 32 bit words from the image builder module and transfers them in SDRAM type memory. They may be stored in successive locations. The image blocks are provided SDRAM addresses assigned by the transfer controller and transmitted through the image builder module to the memory. Alternatively, the addresses could be assigned by the central processor and transmitted through the transfer controller to the memory.

The central processor used to implement the operation will be compatible with the overall operating system. For example, in an environment using Windows CE, available from the Microsoft Corporation of Redmond, Wash. a RISC based processor may be used. As an example, the highly integrated StrongARM processor available from Intel Corporation of Santa Clara, Calif. may be used to provide the imager with a compatible and powerful processor. The processor 20 is typically physically located on the host, however, it is feasible and within the inventive concepts herein disclosed to locate the processor external to the host if the application necessitates such.

Operation begins with an initiate signal 15, such as a scan request, to the central processor, or other component, such as the transfer controller. The processor 20 arms or starts the image capture process by writing a beginning memory address to the transfer controller 90. Once the beginning memory address is written, and at the beginning of the frame, the image data assembler (FPGA) 70 starts receiving the image data segments from the imager 40 across the imager bus 50, and assembling them at the image builder module 60 into longer image data components that are transferred over data bus 130 and stored in memory 100. The beginning memory address is routed to the transfer controller, which is responsible for addressing once the process has started. Alternatively, the beginning memory address could be forwarded directly to memory. The transfer controller also generates an end of frame (EOF) signal to be transmitted to the central processor. The EOF signal is generated in between frames that are produced by the imager. For example, a change (to false) in the HDATA-VALID signal from the imager, or a relatively long pause, may indicate that imager is between frames. The central processor uses this signal to know when the image capture begins and ends. This signals to the processor that a complete frame or image is stored in system memory. When the EOF signal is received at the processor it can then use the image data stored in memory for a snapshot or the image data can be decoded. The decoding process is implemented by the central processor 20, as opposed to invoking a separate decoding processor, and it executes to any of several well known decoding programs that are tailored to the type of symbology being captured.

Figure 2:
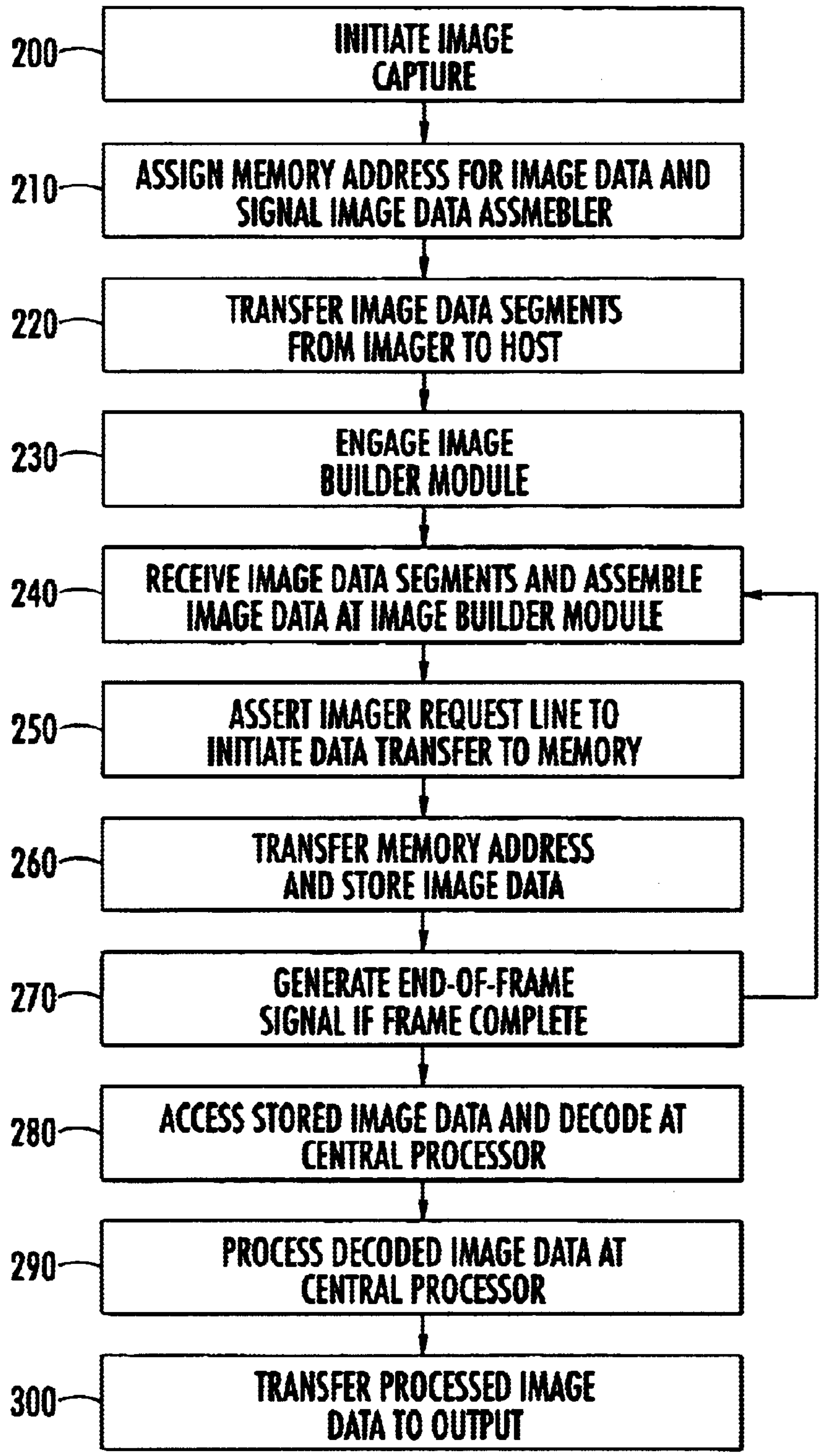
FIG. 2 is a flow chart diagram detailing the image capture and decode process using a centralized processor in accordance with an embodiment of the present invention.

FIG. 2 is a flow chart diagram that depicts the capture and decode operation in accordance with one embodiment of the present invention. At 200, the capture process begins in response to an initiate signal 15 directed to central processor 20. At 210 the central processor assigns a memory address in the host system memory to store image data that is captured. The address may be an initial address, and it may be routed to the transfer controller for updating. Generation of the memory address signals the transfer controller 90, which engages the image data assembler (FPGA) 70 and, at 220, begins the transfer of image data segments from the imager 40. At 230, the image builder module 60 is engaged as, at 240, image data segments stream from the imager 40 to the host in a continuous fashion across an imager bus 50. The image builder module receives the continuous stream of image data and assembles it into image data components. In one embodiment, the image data segments are comprised of eight-bit words that are assembled into groups of four to form 32-bit image data components. These image data components may be held in the image builder module for assembly into larger image data components or transferred to system memory for assembly into image data blocks.

At step 250, the image builder module 60 asserts the image request line 80 to signal the transfer controller to begin the transfer of the assembled image data component block, of a predetermined size, into the system memory 100. The transfer control module receives the image request signal and transfers the memory address, initially generated by the central processor or temporarily stored in the transfer controller to be forwarded to the memory 100. At 260, the memory address is transferred into system memory, if not already present, and one or more image data components are transmitted across the data bus 130 for storage in the system memory at the SDRAM address provided by the transfer controller on line 110 to the memory. In the preferred embodiment, which is subject to variation to maximize system efficiency, steps 240, 250 and 260 continue until all 32-bit words from an image frame have been transferred into system memory to create a unitary image block. When that occurs an end of frame signal is generated between frames indicating that the capturing of the image data is complete and that the image data can be accessed, used, transferred or decoded.

At 280, the central processor accesses the image data in the host system memory, rather than having to access the data in remote memory associated with another processor, and may decode it. At 290 the decoded image data is further processed at the central processor 20 through execution of an application program, such as an inventory program, pricing program, or other application, as may be well known in the art. At 300, the results of the application program may be provided as output 140. Alternatively, the results may be returned to memory, processed further, or provided to another system.

The present invention provides for an imaging device that incorporates a central processor capable of executing the operating system as well as the image capture, decoding and application program processes. Such an imaging device provides for a more streamlined and efficient apparatus. The device provides the user with increased reliability, less processing power requirements, less need for maintenance and a lighter overall unit. By eliminating multiple processors and the associated PCB, hardware, software and interfaces from the overall imaging device architecture, the manufacturer and the end-user benefit from a less-complex device that can be manufactured and sold at a lower cost with improved reliability.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for capturing and decoding barcode image data in an image capture device, the method comprising the steps of:

generating an image capture signal;

receiving, in response to the image capture signal, pixel data of an image;

assembling the pixel data into a plurality of image data blocks;

storing the assembled image data blocks in memory; and decoding a barcode within the assembled image data blocks at a central processor, wherein the central processor executes the operating system and one or more application programs.

2. The method of claim 1, further comprising the step of assigning, at the central processor, in response to generation of the image capture signal, a memory address for an image.

3. The method of claim 1, wherein the step of assembling the pixel data into a plurality of image data blocks further comprises the step of invoking a transfer controller under control of the central processor.

4. The method of claim 3, wherein the step of assembling the pixel data into a plurality of image data blocks is further defined as being initiated upon receipt of a signal from the transfer controller.

5. The method of claim 3, wherein the step of assembling the pixel data into a plurality of image data blocks further comprises the step of invoking the transfer controller to coordinate transfer of the assembled image data blocks to memory.

6. The method of claim 3, wherein the step of assigning, at the central processor, in response to generation of the image capture signal, a memory address for an image further comprises the step of communicating the memory address via the transfer controller.

7. The method of claim 3, wherein the step of invoking a transfer controller further comprises invoking a programmable logic device.

8. The method of claim 1, wherein the step of assembling the pixel data into a plurality of image data blocks further comprises the step of invoking an image builder module to begin an image data assembly process.

9. The method of claim 8, wherein invoking an image builder module further comprises invoking a programmable logic device.

10. The method of claim 1, wherein the step of assembling the pixel data into a plurality of image data blocks further comprises the step of invoking a programmable logic device remote from the central processor.

11. The method of claim 1, further comprising the step of generating an end of frame signal after all image data blocks are stored.

12. The method of claim 1, further comprising the step of executing the application program after the barcode has been decoded.

13. The method of claim 1, wherein the step of storing the assembled image data in system memory further comprises gaining control of the data bus in communication with the image data assembler and the memory module and transferring assembled image data to system memory.

14. The method of claim 1, wherein the step of assembling the pixel data into a plurality of image data blocks further comprises the step of assembling the image data blocks under control of the central processor and an image builder module.

15. The method of claim 1, wherein the step of storing the assembled image data blocks in memory further comprises storing the assembled image data blocks in memory under control of the central processor or a transfer controller.

16. An imaging device for capturing and decoding barcode image data, the device comprising:

- an imager for generating image pixel data;
- an image data assembler in communication with the imager that receives image pixel data from the imager and assembles the pixel data into image data blocks;
- a memory module in communication with the image data assembler that receives assembled image data blocks from the image data assembler and stores the assembled image data blocks; and
- a central processor in communication with the memory module that executes a barcode decode routine on the stored image data blocks and executes a device operating system and one or more application programs.

17. The imaging device of claim 16, wherein the image data assembler comprises an image builder module that receives image pixel data.

18. The imaging device of claim 17, wherein the transfer controller invokes the image builder module in response to a signal from the central processor designating a memory address for the image data blocks that are to be assembled.

19. The imaging device of claim 16, wherein the image data assembler comprises a transfer controller that receives a signal from the central processor.

20. The imaging device of claim 19, wherein the transfer controller invokes an image builder module in response to a signal from the central processor.

21. The imaging device of claim 19, wherein the transfer controller comprises a programmable logic device.

22. The imaging device of claim 16, wherein the image data assembler comprises a programmable logic device.

23. The imaging device of claim 16, wherein the central processor, the image data assembler and the memory module are disposed on a single printed circuit board.

24. The imaging device of claim 16, wherein the image data assembler generates an end of frame signal after the image data blocks are assembled.

25. The imaging device of claim 16, wherein the image builder module comprises a programmable logic device.

* * * * *